United States Patent
Osiecki et al.

(10) Patent No.: US 8,381,039 B1
(45) Date of Patent: Feb. 19, 2013

(54) STORAGE OF MASS DATA FOR MONITORING

(75) Inventors: Daniel L. Osiecki, Seattle, WA (US); Prashant L. Sarma, Bellevue, WA (US); Monty Vanderbilt, Seattle, WA (US); David R. Azari, Seattle, WA (US); Caitlyn R. Schmidt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 771 days.

(21) Appl. No.: 12/493,558

(22) Filed: Jun. 29, 2009

Related U.S. Application Data

(60) Provisional application No. 61/106,901, filed on Oct. 20, 2008, provisional application No. 61/106,903, filed on Oct. 20, 2008.

(51) Int. Cl.
*G06F 11/34* (2006.01)
*G06F 11/30* (2006.01)

(52) U.S. Cl. .............. 714/45; 714/33; 714/37; 714/47.1

(58) Field of Classification Search .................... 714/25, 714/26, 32, 33, 37, 38.1, 45, 47.1, 47.2, 48; 707/957
See application file for complete search history.

(56) References Cited

U.S. PATENT DOCUMENTS

| | | | |
|---|---|---|---|
| 7,076,695 B2 | 7/2006 | McGee et al. | |
| 7,111,059 B1* | 9/2006 | Garcea et al. | 714/38.13 |
| 7,437,281 B1 | 10/2008 | Saghier et al. | |
| 7,577,550 B2 | 8/2009 | Ozonat et al. | |
| 7,617,313 B1 | 11/2009 | Washburn et al. | |
| 7,672,814 B1 | 3/2010 | Raanan et al. | |
| 8,032,797 B1 | 10/2011 | Vanderbilt et al. | |
| 2004/0059701 A1* | 3/2004 | Fedorov | 707/1 |
| 2007/0005296 A1* | 1/2007 | Beresniewicz et al. | 702/181 |
| 2008/0016412 A1 | 1/2008 | White et al. | |
| 2008/0270077 A1* | 10/2008 | Ozonat et al. | 702/186 |
| 2009/0271664 A1 | 10/2009 | Haas et al. | |
| 2010/0083054 A1 | 4/2010 | Marvasti | |

OTHER PUBLICATIONS

U.S. Patent Application entitled "Storage of Mass Data for Monitoring" filed Jun. 29, 2009 and assigned U.S. Appl. No. 12/493,586.

\* cited by examiner

*Primary Examiner* — Joseph D Manoskey
(74) *Attorney, Agent, or Firm* — Thomas | Horstemeyer, LLP

(57) ABSTRACT

Disclosed in various embodiments are systems and methods providing for storage of mass data such as metrics. A plurality of data models are generated in the server from a stream of metrics describing a state of a system. Each of the metrics is associated with one of a plurality of consecutive periods of time, and each data model represents the metrics associated with a corresponding one of the consecutive periods of time. The data models are stored in a data store and each of the metrics is discarded after use in generating at least one of the data models.

24 Claims, 7 Drawing Sheets

```
<XML>
    <Measure>                    ─173
        <Timestamp> 10:02:23 </Timestamp>
        <Date> 11/10/08 </Date>
        <Dimensions>
            <Name> Latency </Name>
            <Namespace> "FSFREKHD88FJS" </Namespace>
  153       <Website> "mywebsite.com" </Website>
            <Pagetype> "Home" </Pagetype>
            <Server> "Server123" </Server>
        </Dimensions>            ─176
        <Value> 300 </Value>
        <Units> milliseconds </Units>
    </Measure>                   ─179
</XML>
```

大成// # STORAGE OF MASS DATA FOR MONITORING

CROSS REFERENCE TO RELATED APPLICATIONS

This application claims priority to U.S. Provisional Patent Application entitled "STORAGE OF MASS DATA FOR MONITORING" assigned application No. 61/106,901 and filed on Oct. 20, 2008, which is incorporated herein by reference in its entirety. This application also claims priority to US Provisional Patent Application entitled "STORAGE OF MASS DATA FOR MONITORING" assigned application No. 61/106,903 and filed on Oct. 20, 2008, which is incorporated herein by reference in its entirety.

BACKGROUND

Large scale data processing systems such as web services and the like can produce vast amounts of log data including metrics. From time to time, such data may be reviewed to diagnose problems with the data processing systems. However, the quantity of log data generated by such systems can present significant difficulties in terms of data storage and review.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 2 is a drawing of a metric transmitted from a data source to a server in the data communication network of FIG. 1 according to an embodiment of the present disclosure.

DETAILED DESCRIPTION

Various large scale computing systems such as those that operate large scale web services can generate massive amounts of data in the form of metrics that describe the performance of such services over time. For example, the number of transactions that large scale electronic commerce systems conduct each day can range in the millions or more, resulting in massive amounts of log data and/or metrics generated on the terabyte scale regarding the performance of such systems. If something should go wrong with the operation of such services, then personnel often search through log data that may include metrics in order to diagnose the problem with the service and ultimately implement a resolution.

However, as such services become even more massive, the amount of metrics they generate increases. As a consequence, it becomes a problem to store all of the log entries or metrics generated by the normal operation of systems. Also, due to the massive amounts of data involved, it becomes more difficult to search through the metrics in order to diagnose and fix problems experienced with a service.

According to various embodiments of the present disclosure, mass data representing metrics are received from various systems that are stored in a manner that allows the creation of monitoring outputs so that individuals who operate large scale systems can be apprised of the operating health of such systems at any given moment. In various embodiments, rather than storing all of the metrics generated by a given service or system, data models comprising an aggregation of the metrics received are generated that take up less storage space. The data models are such that monitoring of the operation of a given system is accomplished even though the original data metrics are not stored and are ultimately discarded. The storage of data models according to the various embodiments is data driven in the sense that the source of the metrics retains control as to how the data is stored by the various applications described herein.

Figure 1:
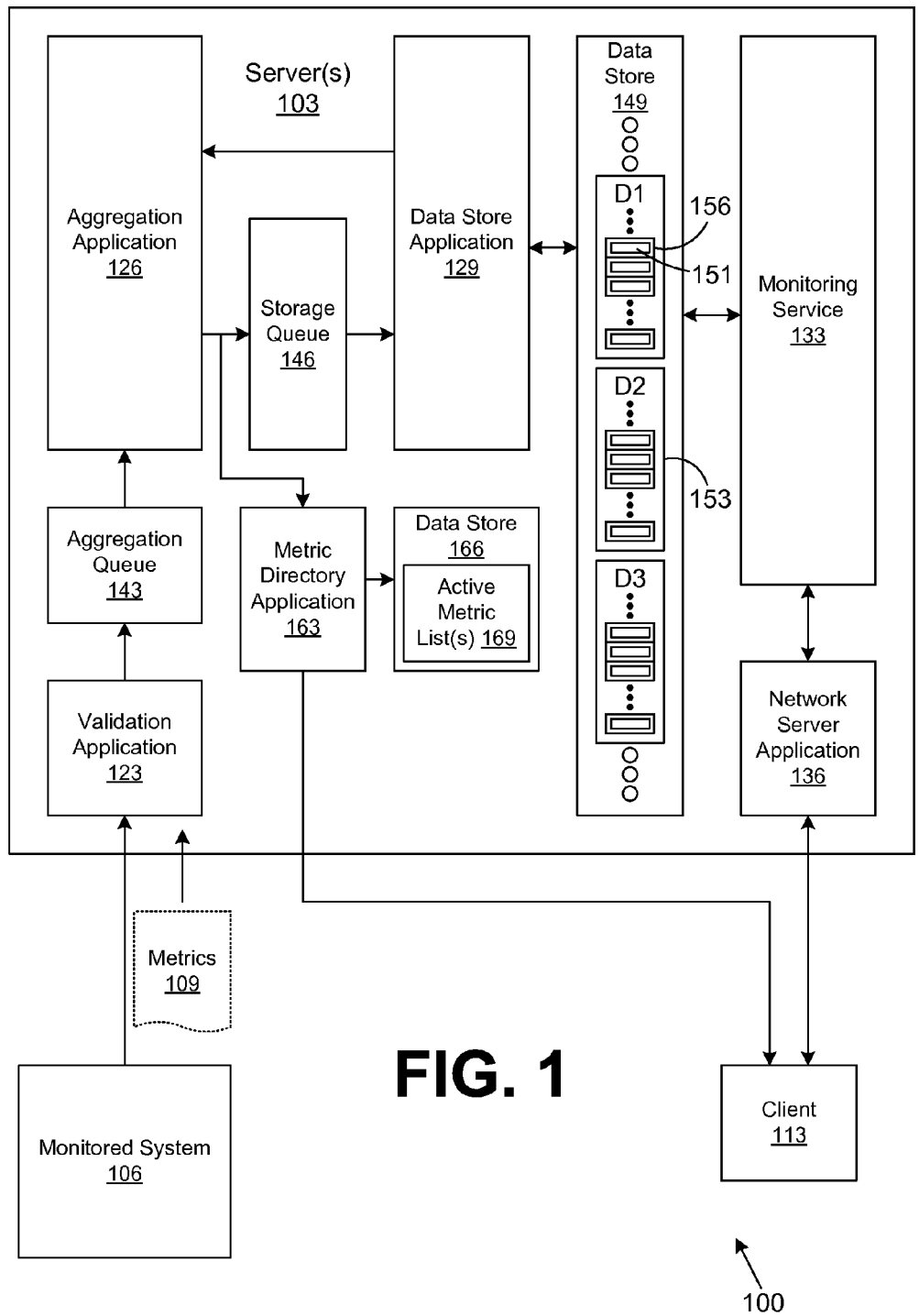
FIG. 1 is a block diagram of a data communication network according to an embodiment of the present disclosure.

With reference to FIG. 1, shown is a data communications network 100 according to various embodiments of the present disclosure. The data communication network 100 includes various devices that communicate with each other over various networks. Such networks may comprise, for example, the Internet, intranets, wide area networks (WANs), local area networks, wireless networks, or other suitable networks, etc., or any combination of two or more such networks.

Among the various devices in the data communication network 100 are one or more servers 103 according to various embodiments. The one or more servers 103 may be arranged in one or more server banks, for example, and may comprise server computers as can be appreciated. The servers 103 may be located in a single installation, or may be distributed among several geographically diverse locations as can be appreciated. For the sake of simplicity, the one or more servers 103 are referred to herein as the server 103, although it is understood that the server 103 as referred to herein may represent multiple servers.

In addition, the data communication network 100 includes a monitored system 106 that generates logs and/or metrics 109 that may be transmitted to the servers 103 as a data stream. In this respect, the data stream as contemplated herein represents the various transfer approaches that may be employed such as batch transfers or other transfers as can be appreciated. The monitored system 106 is an example of a service or physical system that generates the metrics 109.

To this end, the metrics 109 may describe a state of the monitored system 106, which may comprise, for example, an aspect of a performance of the monitored system 106 or other status information that may be quantified by a metric 109 as can be appreciated. For example, the monitored system 106 may comprise a hardware based system such as an actual server computer that performs various functions and that generates various metrics 109 describing the nature of the performance of the functions. Alternatively, the monitored system 106 may comprise an application such as a web service or other service that is executed in one or more server computers as can be appreciated.

The data communication network 100 further includes at least one client 113 that communicates with various services on the servers 103 as will be described. The client 113 may comprise various types of computer systems such as, for example, a desktop, laptop, or other computer system with like capability. To this end, the client 113 may also comprise a personal digital assistant, cell phone, or other portable device with like capability as can be appreciated. The client 113 may interface with the server 103 using various applications such as a browser application, dedicated applications, or other applications as can be appreciated.

There are various applications that are executed on the server 103 according to various embodiments. Also, one or more data stores may be associated with the servers 103 for the storage of data as will be described. Among the applications executed on the servers 103 are a validation application 123, an aggregation application 126, a data store application 129, a monitoring service 133, and a network server application 136. In addition, various storage queues exist within the servers 103 to store data based upon the operation of the various applications. Such storage queues include an aggregation queue 143 and a storage queue 146. It is understood that the above mentioned applications are merely examples of how the functionality they perform may be organized. However, it is possible to perform the same functionality with a different set of applications arranged in an alternative configuration as can be appreciated.

Further, a data store 149 is stored in a memory that is accessible to the server 103. Stored within the data store 149 are data models 151 that represent the metrics 109 as will be described. To this end, the data models 151 stored within the data store 149 are associated with dimensions 153. The dimensions 153 are specified in association with the metrics 109 received in the servers 103 from the monitored system 106. Each of the data models 151 is stored in association with time periods 156. Each time period 156 is associated with a respective one of the dimensions 153 in the data store 149. Each time period 156 comprises one of a plurality of consecutive periods of time associated with a given dimension 153. A dimension 153 comprises a key pair having a dimension label and a value.

As mentioned above, the monitored system 106 generates the metrics 109 that are transmitted or transferred to the server 103 via network or other communication system. Alternatively, it is possible that the monitored system 106 may be executed in the server 103, where the transfer entails transfer among applications in the sever 103.

The metrics 109 are received by the validation application 123 that initially ensures that the metrics 109 conform to specified transfer protocols and/or formats that are predefined. In addition, the validation application 123 is configured to ensure that the number of dimensions 153 specified by the metrics 109 over time do not exceed a predefined threshold, or otherwise does not represent a dimension overrun as will be described. Once metrics 109 are validated by the validation application 123, they are placed in the aggregation queue 143 to be acted upon by the aggregation application 126.

The aggregation application 126 processes the metrics 109 in the aggregation queue 143 and applies the results to the storage queue 146 to be stored in the data store 149 by the data store application 129. According to various embodiments, the aggregation application 126 serves to aggregate multiple metrics 109 for respective time periods 156. To this end, the aggregation application 126 is configured to perform a time aggregation of the metrics 109 received in the server 103 and validated by the validation application 123.

To explain further, according to various embodiments, the rate at which the metrics 109 are received in the validation application 123 is very high. For example, it is possible that the metrics 109 received may comprise multiple terabytes of data per day such as 30 terabytes per day, although the rate of flow may be less than or greater than this benchmark. In some cases, such a flow rate might comprise as many as 200,000, or even up to 500,000 metrics or more each minute, although the flow rate can be any flow rate. It can be rather expensive both economically and in terms of storage space and facilities needed to store each of the metrics 109.

According to one embodiment, rather than attempting to store all of the metrics 109 themselves, data models 151 are constructed in association with each one of a plurality of consecutive time periods 156. Stated another way, the metrics 109 associated with each respective consecutive time period 156 are represented by a data model 151. According to one embodiment, the process of generating the data models 151 comprises aggregating the metrics 109 for each consecutive time period 156, thereby generating one or more aggregate metrics. To this end, a data model 151 may comprise one or more aggregate metrics.

For example, assume each of the consecutive time periods 156 is specified as a single minute, although it is understood that the time periods 156 can be specified as any time interval. Each metric 109 that is associated with a given one of the time periods 156 is aggregated into a data model 151 representing that time period 156. Thus, for a given one minute time period 156, each metric 109 that is associated with the time period 156 is aggregated into the data model 151 for that time period 156. In order to aggregate multiple metrics 109 into a data model 151, various calculations may be performed as will be described. Ultimately, the data model 151 associated with each time period 156 may comprise a number of values representing various information about the metrics 109 for the time period 156.

A metric 109 is associated with a given time period 156, for example, if it has a time stamp that falls within the time period 156 itself. The time stamp associated with a given metric 109 may be generated by the monitored system 106 or it may be generated by the validation application 123 and associated with the metric 109 upon receipt of the metric 109 in the server 103.

A given metric 109 may be involved in the aggregation for multiple time periods 156, where each time period 156 is associated with one of multiple different dimensions 153. A dimension 153 is a category for which data models 151 are maintained in the data store 149 according to the various embodiments of the present disclosure. According to various embodiments, one or more dimensions 153 are associated with each metric 109 received in the server 103. The dimensions 153 are ultimately used to organize the storage of the data models 151 in the data store 149. That is to say, each of the data models 151 associated with a given time period 156 is stored in the data store 149 in association with one of the dimensions 153.

When a metric 109 is received in the server 103, for example, with one or more associated dimensions 153, then the metric 109 is used in the aggregation associated with a respective time period 156 for each of the associated dimensions 153. Thus, a given metric 109 may be used in aggregation that results in multiple different data models 151 associated with the respective time periods 156 of the dimensions 153 associated with the metric 109.

To this end, when the aggregation application 126 processes a given metric 109, it determines the dimensions 153 associated with the metric 109. Thereafter, the aggregation application 126 includes the metric 109 in the aggregation resulting in the data models 151 for respective time periods 156 associated with the dimensions 153 that were included with the metric 109.

According to one embodiment, once a metric 109 is included in the aggregations performed for one or more time periods 156 of respective dimensions 153, then the aggregation application 126 discards the metric 109. From this point on, only the data models 151 for the respective time periods 156 may be accessed in order to perform diagnostics or other functions with respect to the operation of the monitored system 106 as the actual metrics 109 generated no longer exist. Stated another way, the actual metrics 109 are not recoverable as they are not actually stored after the aggregation that results in the generation of the data models 151. This is advantageous as the amount of storage space to store the data models 151 in association with the time periods 156 is substantially less than the amount of storage space that would be needed to store the actual metrics 109 themselves. The storage of data models 151 in place of actual metrics 109 may represent a reduction of data to be stored, for example, by a ratio of 1000 to 1 or other ratio.

According to one embodiment, the dimensions 153 by which the storage of data is organized in the data store 149 may be increased or expanded based upon the appearance of the dimension 153 in a metric 109 received in the server 103. To increase or expand the dimensions 153 in this sense means to add a new dimension 153 to those already in existence. According to one embodiment, a new dimension 153 is created merely by its first appearance in association with a metric 109. According to various embodiments, when the aggregation application 126 encounters a new dimension 153 associated with a metric 109, then the aggregation application 126 is configured to begin aggregation of subsequent metrics 109 for the new dimension 153 beginning with a pending time period 156 that includes the time stamp of the metric 109 that first included the new dimension 153.

In this respect, the storage of the data models 151 is data driven. The dimensions 153 with which the data models 151 are associated in the data store 149 are created based upon the metrics 109 received in the server 103. Stated another way, the dimensions 153 are not pre-configured or specified in the data store 149. This advantageously provides a significant amount of flexibility for the operators of the monitored system 106 in the storage of metrics 109. Specifically, the control as to the dimensions 153 under which metrics 109 are aggregated and stored is retained by the operators of the monitored system 106.

At the same time, the validation application 123 is configured to detect whether an expansion of the dimensions 153 comprises an error. This may be the case, for example, when the expansion would result in the creation of too many dimensions 153 for a given monitored system 106 as will be described. For example, the validation application 123 may be configured to limit the number of dimensions 153 for a given entity to a threshold number of dimensions 153 at any given time based on prior agreement. Once the limit has been exceeded, the validation application 123 may generate an error in the server 103 that informs local personnel that the expansion of dimensions 153 resulted in a total number of dimensions 153 that exceeds the permissible threshold number of dimensions 153.

Alternatively, the validation application 123 may be configured to detect whether the expansion of the dimensions 153 comprises an error by detecting whether a new dimension 153 is actually an erroneous variation of a prior existing dimension 153 that results in the erroneous appearance of a new or previously non-existing dimension 153. For example, in some cases, the monitored system 106 may append a given dimension 153 with a time stamp or other data.

Once the aggregation for a given time period 156 appears to be completed as it appears that there will be no further metrics 109 received with a time stamp associated with the time period 156, then the data model 151 resulting from the aggregation is placed in the storage queue 146 to be stored in the data store 149 in association with the respective dimension 153. Thus, the data for each dimension 153 in the data store 149 comprises data associated with multiple consecutive time periods 156.

According to one embodiment, the data models 151 are stored in the data store 149 for a limited period of time. To this end, the data store application 129 may be configured to discard the data models 151 after they have been stored for a predefined period of time. The length of the storage time may vary depending upon how much storage space exists, the quantity of data represented by the data models 151 or other data that is to be stored, and/or the purpose for storing the data. Such a time period may comprise, for example, two weeks or other time period. In any event, the purpose, such as a business purpose, for storing the data may dictate that the storage time be specified regardless of the amount of storage space used, etc.

In addition, the monitoring service 133 is configured to provide information based upon the data models 151 stored in the data store 149 in response to requests from the client 113. In this manner, the monitoring service 133 is configured to generate an output that indicates a performance of the monitored system 106 based on the data models 151 stored in the data store 149.

To this end, the network server application 136 may comprise a web server or other server application that facilitates browser access or other access to the monitoring service 133. The monitoring service 133 may be configured to generate reports based on the data stored in the data store 149. Such reports may relay information about the past performance of the monitored system 106. The reports may be predefined and generated automatically to be sent to the client 113 for a given entity, or the reports may be requested in real time by the client 113. For example, a given entity may request certain reports based on the dimensions 153 for which data is stored in the data store 149. In addition, other approaches may be employed in generating reports and the like to be rendered on the client 113 so that the operational health of the monitored system 106 can be monitored.

In addition, according to another embodiment, the applications executable on the server further include a metric directory application 163 that maintains one or more active metric lists 169 in a data store 166. The metric directory application 163 serves to maintain a list of active metrics 109 for which data models 151 may be retrieved. To this end, each time a data model 151 generated from one or more instances of a metric 109 is to be stored in the data store 149, a copy of the same is supplied to the metric directory application 163. Alternatively, copies of metrics 109 themselves may be sent to the metric directory application 163. Each active metric list 169 may be stored in the form of a table, database, or other data structure.

Based on the copy of the data models 151 received, the metric directory application 163 maintains one or more active metric lists 169. Specifically, an active metric list 169 includes a listing of active metrics 109 that are currently stored in the data store 149 that may be accessed through the monitoring service 133. Specifically, in order to access the data embodied in the data models 151 for purposes of monitoring the operation of the monitored system 106, the client 113 can initially request a directory of the metrics 109 for which data is stored in the data store 149. Alternatively, such a directory may be automatically be generated when the client 113 attempts to access the data in the data store 149 in a home page or other starting point of entry. An active metric list 169 may be associated, for example, with a given entity that sends metrics 109 to the server 103.

In response to a request, or in generating an initial portal such as a home page, etc., to be sent to a client 113, the metric directory application 163 is configured to generate a current list or directory of active metrics 109 for which data models 151 are currently stored in the data store 149 to be presented to the client 113. To ensure that the current list or directory of active metrics 109 is, in fact, current, the metric directory application 163 is configured to maintain the active metric list 169.

To do this, according to one embodiment, a metric 109 is not listed on the active metric list 169 if the last instance of the metric 109 received from the monitored system 106 has been stored in the data store 149 longer than a predefined period of time. In one example, such a period of time may be any time period measured in minutes, hours, days, weeks, months, or other interval. One example time period may comprise 2 weeks, although the time period may vary depending upon factors such as available storage space and other variables.

According to one embodiment, when the metric directory application 163 receives a new metric 109 from the aggregation application 126 either in the form of a metric 109 itself or as a data model 151 that was not listed in the active metric list 169, the metric directory application 163 identifies a current timestamp associated with the metric 109 and stores both information about the metric 109 and the current timestamp in a respective active metric list 169.

If the metric 109 was included in the active metric list 169 previously, then the metric directory application 163 simply updates the timestamp associated with such metric 109 with the timestamp of the most recently received instance of the metric 109. In this manner, an up-to-date list of the current active metrics 109 and/or data models 151 in an active metric list 169 is maintained.

In addition, when the timestamp associated with a given metric 109 in an active metric list 169 indicates that the most recent data associated with a metric 109 has been stored in the data store 149 longer than the predefined storage time period mentioned above, the metric directory application 163 proceeds to remove such metric 109 from the active metric list 169. Assuming, for example, that data models 151 are only stored in the data store 149 for the predefined storage time period, then such data models 151 would not be available as they may have been discarded. Under such circumstances, metrics 109 listed in the active metric list 169 have become stale. Accordingly, the removal of stale metrics 109 from the active metric list 169 by the metric directory application 163 ensures that clients 113 do not attempt to access metrics 109 that no longer exist in the data store 149.

In addition, an entity that operates a given monitored system 106 may opt not to include their metrics 109 in an active metric list 169 due to concerns about privacy or security. To this end, such entities may cause an identifier to be included in the metrics 109 sent to the server 103 that direct the metric directory application 163 to ignore or discard such metrics 109 so that they are not included in an active metric list 169.

With reference to FIG. 2, shown is one example of a metric 109 (FIG. 1) as generated by a monitored system 106 according to an embodiment of the present disclosure. The metric 109 is expressed in extensible markup language (XML), although it is understood that the metric 109 may be expressed in other languages and formats as can be appreciated. The metric 109 includes the dimensions 153 (FIG. 1) such as "Name," "Namespace," "Website," "Page Type," and "Server." It is understood that these dimensions 153 are merely examples of the many different kinds of dimensions 153 that may be included in the given metrics 109. To this end, the dimensions 153 may be any category that may be reduced to a variable or other value as can be appreciated. Further associated with the metric 109 is a time stamp 173 that indicates a time that the metric 109 was generated. Although the dimensions 153 are depicted as including "Name" and "Namespace," in some embodiments these fields may not comprise dimensions 153 and may be located elsewhere within the metric 109 outside of the "Dimensions" nest.

The time stamp 173 thus may identify a state of the monitored system 106 at the time that the metric 109 was created. In the example of FIG. 2, the time stamp 173 indicates the latency associated with the generation of a web page. The time stamp 173 is thus generated when the latency was identified after the page was generated itself. Alternatively, a metric 109 may be received at the server 103 (FIG. 1) without a time stamp 173. In such case, the validation application 123 may be configured to generate a time stamp 173 upon receipt of a metric 109 and associate such time stamp 173 with the metric 109.

The metric 109 further includes a value 176 that describes some aspect of the operation of the monitored system 106 (FIG. 1). For example, the value 176 described in the metric 109 of FIG. 2 is a number that represents the latency associated with the generation of a web page. However, it is understood that the value 176 associated with a metric 109 may represent an aspect of the monitored system 106 that can be expressed by or quantified into a number as can be appreciated. In addition, the metric 109 further expresses the units 179 of the value 176.

To provide specific examples, metrics 109 may indicate percent utilization of processor resources, and the traffic throughput associated with network interfaces. The metrics 109 may include the number of bytes that are written to, or read from, a disk or other type of memory. The metrics 109 may relate to response latencies, request counts, and the number of instances of healthy and/or unhealthy hosts. In addition, the metrics 109 may relate to other parameters associated with the operation or usage of a given monitored system 106.

Figure 3:
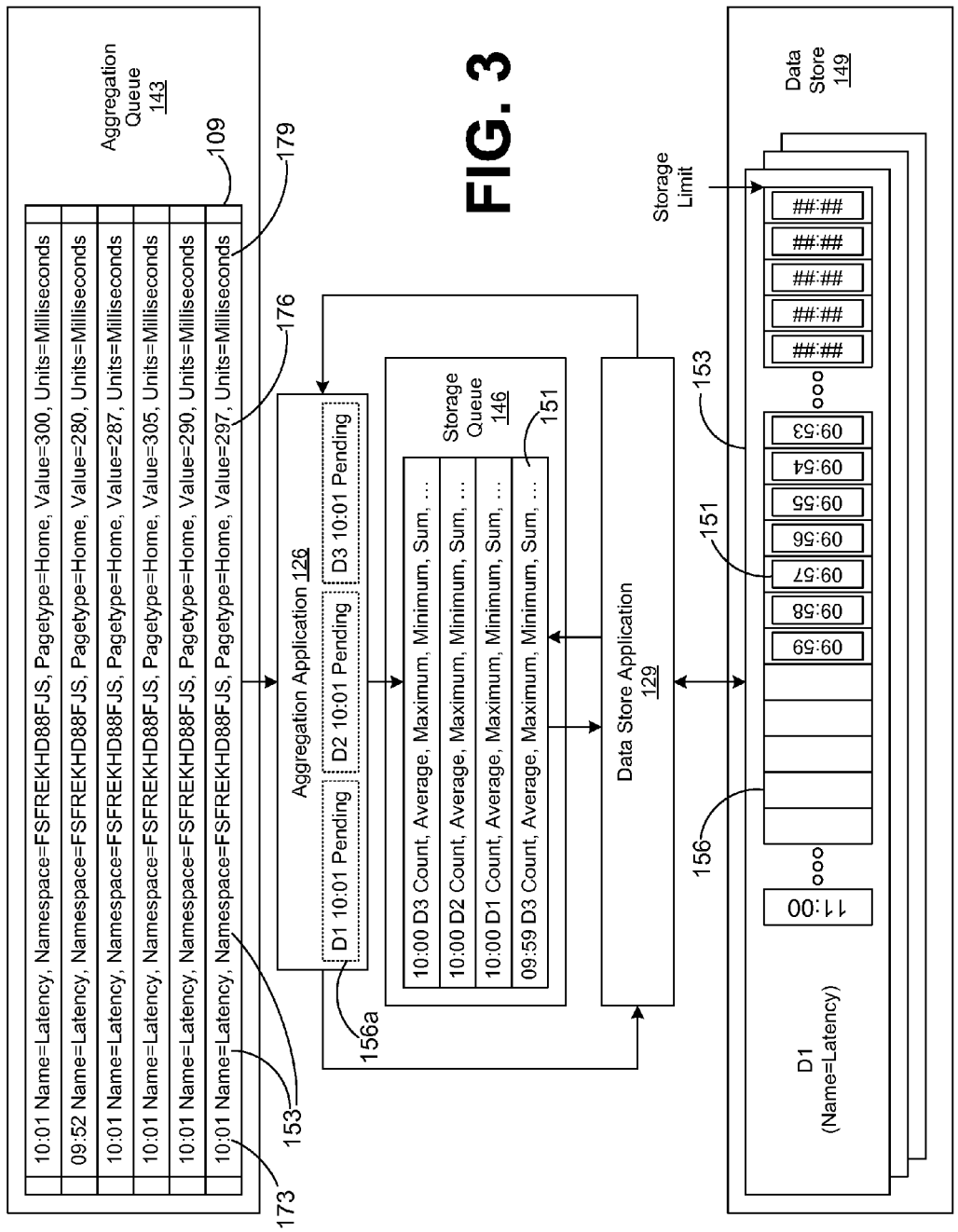
FIG. 3 is a drawing that illustrates one example of an operation of data storage applications in the server in the data communication network of FIG. 1 according to an embodiment of the present disclosure.

With reference to FIG. 3, shown is a block diagram that illustrates the operation of the various components in the server 103 according to various embodiments of the present disclosure. To this end, FIG. 3 depicts the aggregation queue 143, the aggregation application 126, the storage queue 146, the data store application 129, and the data store 149. The aggregation queue 143 includes several metrics 109 that are expressed in terms of a time stamp 173, various dimensions 153, a value 176, and units 179.

The aggregation application 126 accesses the metrics 109 from the aggregation queue 143 and performs a time aggregation, thereby generating a data model 151 for each time period 156 as described above. For example, as shown in FIG. 3, the aggregation application 126 currently is generating data models 151 for pending time periods 156a for three different dimensions 153, namely, dimensions D1, D2, and D3. The dimensions D1, D2, and D3 correspond to the dimensions 153 in the metrics 109 which comprise a name, name space, and page type. It is understood that the dimensions 153 described herein are merely provided as examples, where other dimensions 153 may be employed. The aggregation application 126 calculates a data model 151 for a pending time period 156a for each of the dimensions 153. For example, as shown with respect to FIG. 3, the current pending time periods 156a are for the one minute interval beginning with "10:01."

There are three pending time periods 156a for the three dimensions 153, where each time period 156 is stored in association with the respective one of the dimensions 153 in the data store 149. As the aggregation application 126 obtains metrics 109 from the aggregation queue 143, it calculates the data models 151 for each of the pending time periods 156a for the respective dimensions 153 or any other dimensions 153 encountered. At some point, it is deemed that no further metrics 109 are likely to be received for a pending time period 156. At such time, the aggregation application 126 places the results of the aggregation of the metrics 109 for a pending time period 156a into the storage queue 146 to be stored in the data store 149.

The data models 151 that are placed in the storage queue 146 may comprise, for example, a plurality of aggregated metrics that describe or represent the metrics 109 associated with the respective time periods 156 that were received in the server 103 from the monitored system 106 (FIG. 1). To this end, the aggregated metrics may comprise, for example, a total count of the metrics 109 associated with the respective time period 156, an average of the values 176 associated with the metrics 109 of the respective time period 156, a maximum one of the values 176, and/or a minimum one of the values 176. Also, a sum of the values 176 may be maintained as well as any other type of aggregated metric or other information about the metrics 109 for a given time period 156.

The types of aggregate metrics calculated relate to the degree of aggregation performed for the respective time periods 156. Thus, the degree of aggregation relates to the degree of detail in the information maintained in a data model 151 relative to the metrics 109 associated with a given time period 156. The degree of aggregation is lower if more aggregate metrics are calculated or if a greater amount of information is retained in the data model 151. Also, the converse is true in that the degree of aggregation is higher if less aggregate metrics are calculated, or if a lesser amount of information is retained in a data model 151.

The degree of aggregation relates also to the length of the time periods 156 for which data models 151 are generated. The degree of aggregation decreases as the time periods 156 decrease. Conversely, the degree of aggregation increases as the time periods 156 increase.

The degree of aggregation selected may depend in part upon what data is needed to monitor the monitored system 106. To this end, the nature of the data models 151 stored determines to some extent how a monitored system 106 can be monitored. For example, it may be necessary to examine the data models 151 to determine whether the monitored system 106 is in compliance with operational thresholds. The data models 151 should reflect the data needed to determine and/or measure the performance of the monitored system 106 with respect to the operational thresholds. For example, if an average latency becomes greater than a given threshold, it may be necessary to take corrective action such as bringing extra resources such as processing capacity to reduce latency. Alternatively, the degree of aggregation of the metrics 109 for each time period 156 is specified so as to create the data models 151 having the needed aggregate metrics that enable general monitoring of a performance of the monitored system 106 that may or may not be measured with respect to one or more predefined operational thresholds.

In some situations, the aggregation application 126 may obtain a late one of the metrics 109 from the aggregation queue 143. For example, as depicted in FIG. 3, the aggregation queue 143 includes mostly metrics 109 that have a time stamp 173 of 10:01. However, one of the metrics 109 has a time stamp 173 of "09:52." This represents a metric 109 that for some reason was being received relatively late from the monitored system 106. Such "late" metrics 109 represent metrics 109 received out of temporal order relative to the other metrics 109.

According to one embodiment, the aggregation application 126 may send a request to the data store application 129 for the data model 151 for the respective time period 156 associated with the late metric 109. The data store application 129 then accesses the data model 151 for the respective time period 156 and returns the same to the aggregation application 126. In the case that the late one of the metrics 109 is associated with a time period 156 that is stored in the storage queue 146, the data store application 129 may search the storage queue 146 after it is determined that the given time period 156 has not yet been stored in the data store 149.

In response to the request from the aggregation application 126, the data store application 129 returns the data model 151 associated with the time period 156 of the late one of the metrics 109 so that the respective data model 151 may be updated with the late one of the metrics 109. Thereafter, the aggregation application 126 places the updated one of the data models 151 in the storage queue 146 to be placed into the data store 149. In this respect, the updated one of the data models 151 may be stored in the data store 149. In one alternative, the updated one of the data models 151 may be written over the prior data model 151 as can be appreciated.

This provides a distinct advantage in that the aggregation application 126 can maintain values for aged ones of the time periods 156. This addresses situations where metrics 109 may be held up in transit over various networks such as the Internet or other networks as can be appreciated.

In addition, it should be noted that the time periods 156 stored for a given dimension 153 may have a time stamp 173 that is greater than the current time as noted by the server 103 as it is possible that the monitored system 106 may have a clock that is set earlier with respect to the clock of the server 103. Consequently, the time stamps 173 associated with the respective time periods 156 may extend into the future relative to the time as known by the server 103. According to one embodiment, a cutoff is specified such that metrics 109 received with a time stamp 173 that is too far in the future relative to the clock of the server 103 are ignored or an error occurs that requires corrective action taken to fix the time stamp 173 problem in the monitored system 106. According to one embodiment, the limit to the future time stamps 173 allowable is one hour from the current time of the server 103 or other time limit as can be appreciated. Such a time limit reflects the fact that there may be a malfunction associated with the monitored system 106 such that time stamps 173 are being generated that are too far in the future relative to the actual time of the metrics 109 generated.

In addition, the aggregation queue 143 and the storage queue 146 are employed, and the various functional components are configured, so as to prevent a loss of data upon an occurrence of a loss of power, etc.

Figure 4:
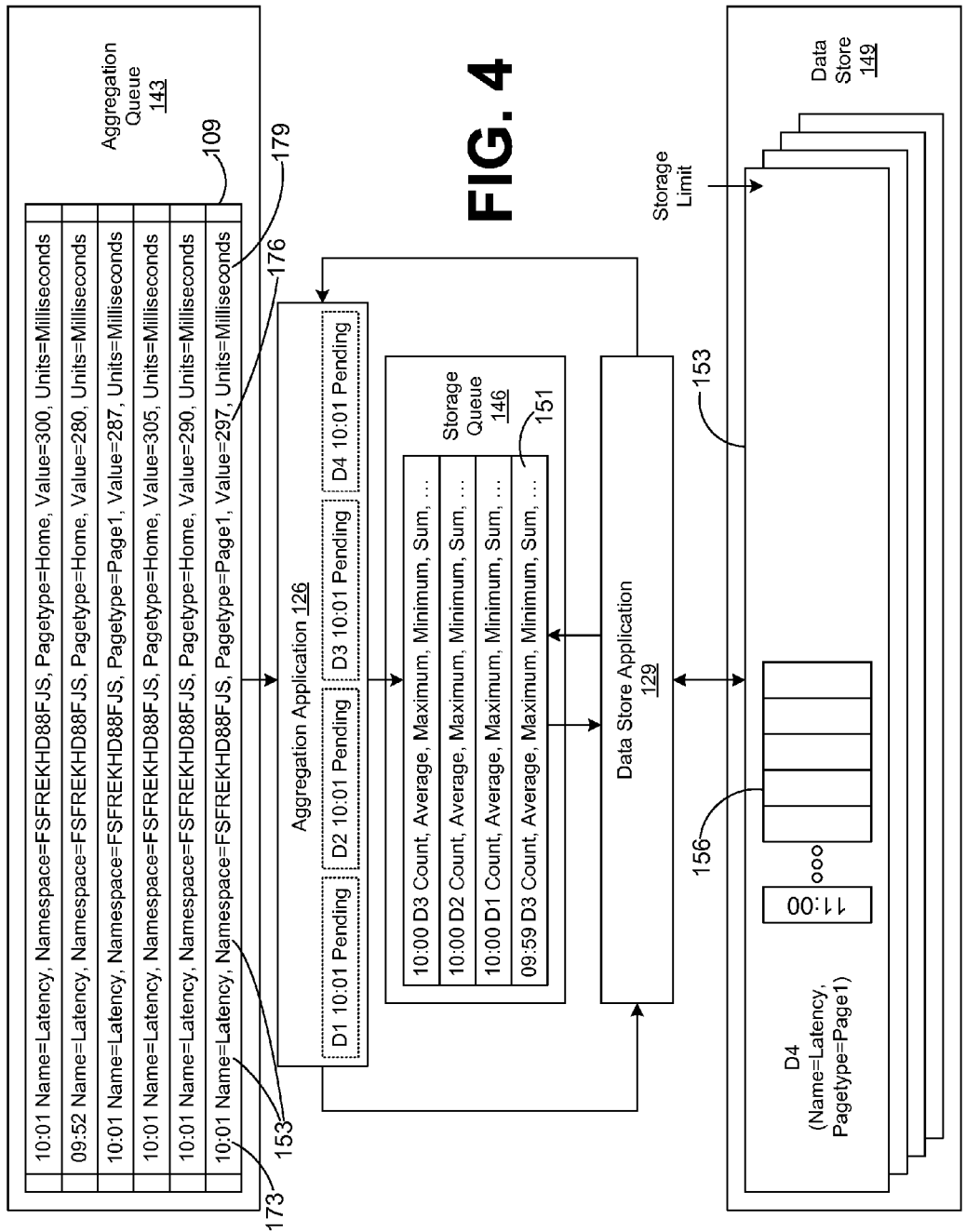
FIG. 4 is a drawing that illustrates another example of an operation of data storage applications in the server in the data communication network of FIG. 1 according to an embodiment of the present disclosure.

Referring next to FIG. 4, shown is another example of the operation of the various components as was described with FIG. 3 according to various embodiments. As shown in FIG. 4, at some point during the receipt of metrics 109 in the aggregation queue 143, a new dimension 153 is experienced. In particular, a new dimension of "page type=page1" appears in the aggregation queue 143. In response to the appearance of a new dimension 153, the aggregation application 126 generates a new pending time period D4 associated with the new dimension 153. Also, the aggregation application 126 may communicate to the data store application 129 that the new dimension D4 has been created for storage in the data store 149.

Alternatively, the data store application 129 may store the respective data model 151 associated with the new dimension 153 in the data store 149 automatically when it accesses a data model 151 associated with a new dimension 153 from the storage queue 146. This illustrates the fact that the storage of the data models 151 in the data store 149 is data driven. That is to say, data is stored in association with new dimensions 153 automatically based upon the dimensions 153 associated with the metrics 109 that are received by the server 103 from the monitored system 106 as can be appreciated.

Figure 5:
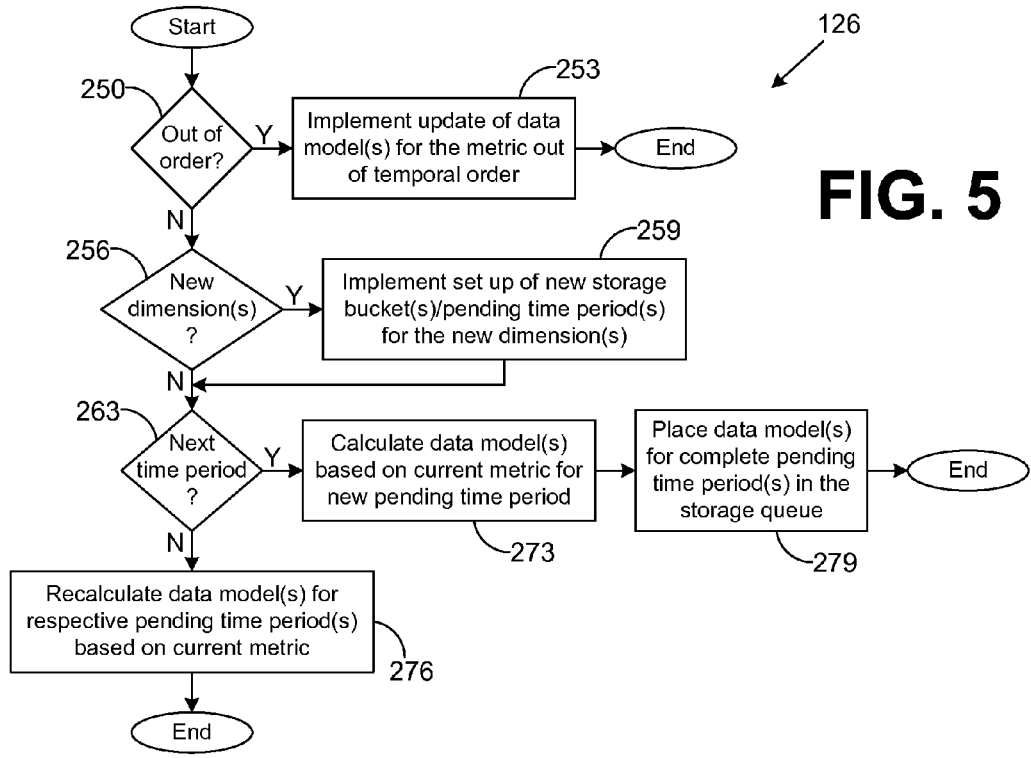
FIG. 5 is a flowchart that illustrates one example of various functionality of an aggregation application executed in the server in the data communication network of FIG. 1 according to an embodiment of the present disclosure.

With reference to FIG. 5, shown is a flowchart that illustrates one example of various functionality of the aggregation application 126 in view of the foregoing discussion. Alternatively, the flowchart of FIG. 5 may be viewed as depicting steps of a method implemented in the server 103 (FIG. 1).

The flowchart of FIG. 5 represents, for example, a routine that is executed for each metric 109 (FIG. 2) obtained from the aggregation queue 143 (FIG. 3). Assuming that a given metric 109 has been obtained from the aggregation queue 143 (FIG. 3), then in box 250, the aggregation application 126 determines whether the time stamp 173 (FIG. 2) associated with the metric 109 is out of temporal order with respect to the current pending time periods 156a (FIG. 3) for the respective dimensions 153 (FIG. 3) maintained by the aggregation application 126 at any given time. A metric 109 may be out of order if the one or more data models 151 (FIG. 3) that should take the current metric 109 into account have already been stored in the storage queue 146 (FIG. 1) or the data store 149 (FIG. 1) in association with the respective one of the dimensions 153.

If it is determined that the current metric 109 is out of temporal order in box 250, then the aggregation application 126 proceeds to box 253. Otherwise, the aggregation application 126 progresses to box 256. In box 253, the aggregation application 126 implements an update of the one or more data models 151 associated with the metric 109 that is out of temporal order with respect to the current pending time periods 156 of the aggregation application 126. This may involve communication with the data store application 129 (FIG. 1) in order to retrieve the respective data models 151 that need to be updated as described above. Thereafter, the aggregation application 126 ends as shown.

In box 256, the aggregation application 126 determines whether a new dimension 153 exists in the current metric 109 obtained from the aggregation queue 143. If such is the case, then the aggregation application 126 proceeds to box 259. Otherwise, the aggregation application 126 progresses to box 263.

In box 259, the aggregation application 126 implements the setup of a new storage bucket and pending time period 156a for the new dimension 153. A storage "bucket" in this sense is an abstraction to represent the storage of data models 151 or other data in association with the new dimension 153 in the data store 149. In order to implement the setup of the new storage bucket for the new dimension 153, the aggregation application 126 may communicate with the data store application 129 to inform the data store application 129 of a need for the new storage bucket for the new dimension 153.

Alternatively, the aggregation application 126 may simply create a new data model 151 associated with a new pending time period 156a for the new dimension 153. Note that if there are time periods 156 in which no metrics 109 were received from which a data model 151 can be calculated, then no data models 151 are stored for such time periods 156. In this sense, the time records represented by the time periods 156 for a given dimension 156 may have gaps without data.

From box 259, the aggregation application 126 proceeds to box 263. In box 263, the aggregation application 126 determines whether the time stamp 173 (FIG. 2) associated with the current metric 109 is to be included in the calculation of the data models 151 of the pending one of the time periods currently maintained by the aggregation application 126, or if the new metric 109 is to be included in the calculation of a data model 151 for the next consecutive time period 156 of one or more dimensions 153. Assuming that the metric 109 includes dimensions 153 associated with the next consecutive ones of the time periods 156, then the aggregation application 126 proceeds to box 273. Otherwise, the aggregation application 126 progresses to box 276.

In box 273, one or more data models 151 associated with new pending time periods 156a that are in turn associated with the current metric 109 are calculated. Thereafter, in box 279, one or more data models 151 associated with corresponding time periods 156 that are presumed complete are placed in the storage queue 146 (FIG. 3) for storage in the data store 149 (FIG. 1). In this respect, the aggregation application 126 may maintain a minimum number of consecutive time periods 156 for each dimension 153 as pending time periods 156a before being placed in the storage queue 146.

Such time periods 156 may be maintained on a first in first out basis as can be appreciated. The decision as to whether to place a given data model 151 associated with a respective time period 156 into the storage queue 146 depends upon whether it is believed that any additional metrics 109 will be received that have not been processed for the respective one or more time periods 156. This may determine how many consecutive time periods 156 for each dimension 153 are maintained as pending by the aggregation application 126 at any given time. Assuming that there are any pending time periods 156a that are placed in the storage queue in box 279, thereafter, the aggregation application 126 ends as shown.

Referring to box 276, assuming that the time stamp 173 of the current metric 109 does not require the creation of new time periods 156 for respective dimensions 153 as described above, then in box 276 the data models 151 for current pending time periods 156 are recalculated based upon the current metric 109 received from the aggregation queue 143. Thereafter, the aggregation application 126 ends.

Figure 6:
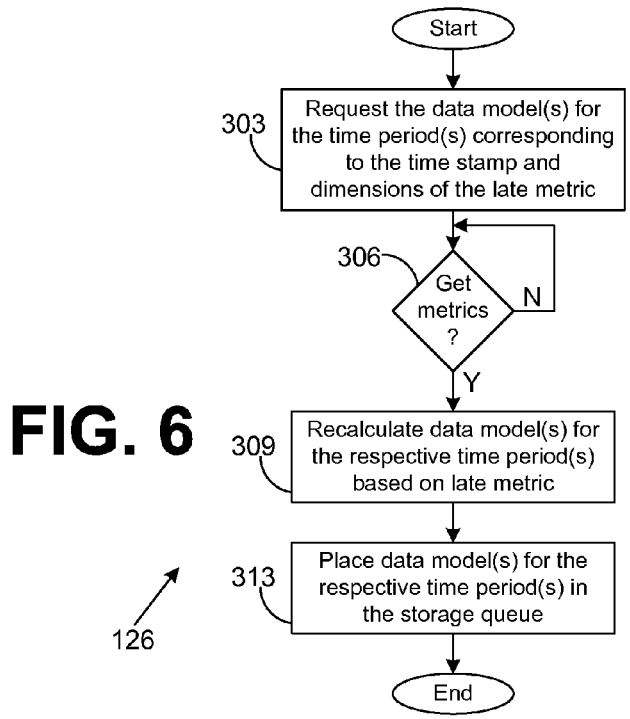
FIG. 6 is a flowchart that illustrates another example of further functionality of the aggregation application executed in the server in the data communication network of FIG. 1 according to an embodiment of the present disclosure.

With reference to FIG. 6, shown is a flowchart that depicts an example of functionality of the aggregation application 126 in updating the data models 151 (FIG. 3) associated with a time period 156 (FIG. 1) for a given dimension 153 (FIG. 1) that is already stored in the data store 149 (FIG. 1), where one of the metrics 109 (FIG. 2) has been received out of temporal order by the aggregation application 126. Alternatively, the flowchart of FIG. 6 may be viewed as steps of a method implemented in the server 103 (FIG. 1) to accomplish the same.

Beginning with box 303, upon receiving a metric 109 that is out of temporal order and is to be taken into account in the calculation of data models 151 of previously stored time periods for respective dimensions 153 indicated in the metric 109, the aggregation application 126 requests the data models 151 for the respective time periods 156 corresponding to the time stamp 173 (FIG. 2) and the dimensions 153 of the late metric 109. This request may be provided to the data store application 129 that may obtain the data models 151 requested and transmit them back to the aggregation application 126.

In box 306, the aggregation application 126 determines whether the data models 151 requested have been received from the data store application 129 or are otherwise available to the aggregation application 126. Assuming such is the case, then in box 309 the aggregation application 126 recalculates the data models 151 for the respective time periods 156 based on the late received metric 109. Thereafter, in box 313, the data models 151 for the respective time periods 156 are placed in the storage queue 146 to ultimately be stored in the data store 149 in association with the respective time period of a given dimension 153 as described above. As mentioned above, it may be the case that the newly calculated data models 151 for the respective time periods 156 are ultimately written over the previously existing time periods 156. Thereafter, the aggregation application 126 ends as shown.

Figure 7:
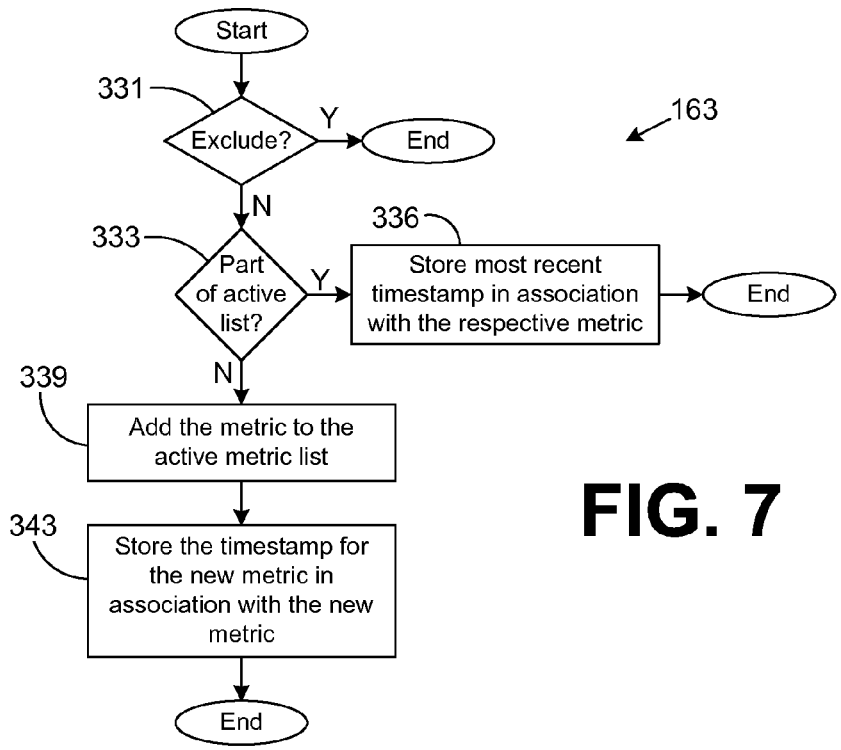
FIG. 7 is a flowchart that illustrates an example of functionality of a metric directory application executed in the server in the data communication network of FIG. 1 according to an embodiment of the present disclosure.

With reference to FIG. 7, shown is a flowchart that depicts an example of functionality of the metric directory application 163 in maintaining and adding metrics 109 (FIG. 1) to the active metric list 169 (FIG. 1). Alternatively, the flowchart of FIG. 7 may be viewed as steps of a method implemented in the server 103 (FIG. 1) to accomplish the same.

Beginning with box 331, the metric directory application 163 determines whether an identifier is associated with a metric 109 or data model 151 (FIG. 1) that indicates that the metric 109 or data model 151 is to not be included in an active metric list 169. If such is the case, the metric directory application 163 ends as shown where the metric 109 or data model 151 is ignored and/or discarded. Otherwise, the metric directory application 163 proceeds to box 333. In box 333, the metric directory application 163 examines a metric 109 or data model 151 representing multiple instances of a metric 109 from the aggregation application 126 or other source to identify whether such metric 109 currently exists as part of the active metric list 169. If so, then the metric directory application 163 proceeds to box 336. Otherwise, the metric directory application 163 moves to box 339.

In box 336, the metric directory application 163 stores the most recent timestamp for the metric 109 in the active metric list 169 in association with the metric 109 itself. Thereafter, this function of the metric directory application 163 ends.

In box 339, the metric directory application 163 adds a previously nonexisting metric 109 to the active metric list 169. Thereafter, in box 343, a timestamp for the newly added metric 109 is stored in association with the newly added metric 109 in the active metric list 169. Thereafter, this function of the metric directory application 163 ends as shown.

Figure 8:
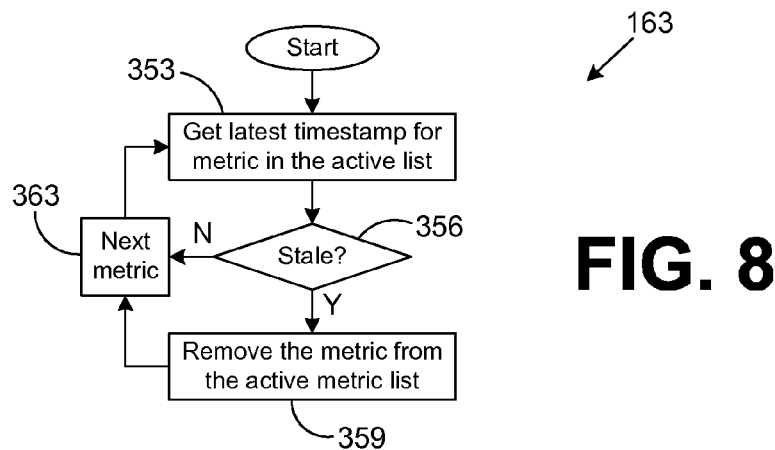
FIG. 8 is a flowchart that illustrates an example of further functionality of the metric directory application executed in the server in the data communication network of FIG. 1 according to an embodiment of the present disclosure.

With reference to FIG. 8, shown is a flowchart that depicts an example of further functionality of the metric directory application 163 (FIG. 1) in removing stale or out-of-date metrics 109 (FIG. 1) from the active metric list 169 (FIG. 1). Alternatively, the flowchart of FIG. 7 may be viewed as steps of a method implemented in the server 103 (FIG. 1) to accomplish the same. The functionality of the metric directory application 163 comprises a loop that cycles for each of the metrics 109 stored in the active metric list 169.

Beginning with box 353, the metric directory application 163 gets the latest timestamp 173 (FIG. 2) for the current metric 109 in the active metric list 169 under consideration. Then, in box 356, the metric directory application 163 determines whether the metric 109 is stale based upon the timestamp 173 associated therewith given that data models 151 (FIG. 1) may only be stored for a predefined period of time. If the respective metric 109 is stale, then the metric directory application 163 proceeds to box 359 in which the stale metric 109 is removed from the active metric list 169. If the metric 109 is determined to not be stale in box 356, then this portion of the metric directory application 163 moves to box 363 in order to designate the next metric 109 listed in the active metric list 169 for consideration. Once a metric 109 is removed from the active metric list 169, the metric directory application 163 proceeds to box 363 to designate the next metric 109 for consideration. Accordingly, this portion of the metric directory application 163 continually checks each of the metrics 109 to identify those that are stale and removes them from the active metric list 169.

Figure 9:
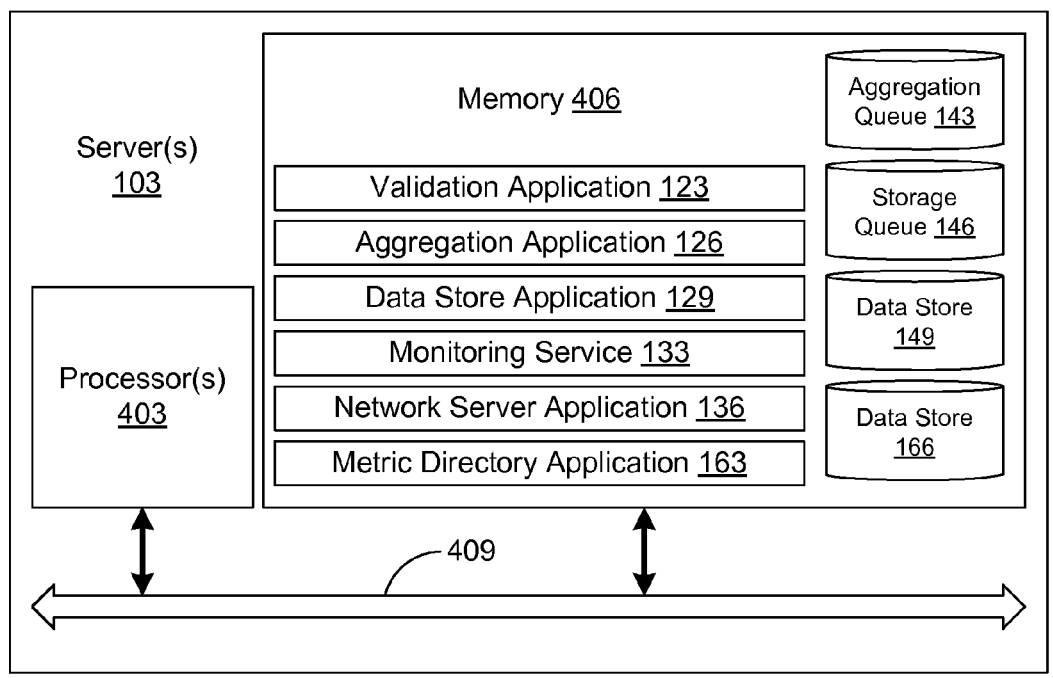
FIG. 9 is a schematic block diagram of one example of a server in the data communication network of FIG. 1 according to an embodiment of the present disclosure.

Referring next to FIG. 9, shown is a schematic block diagram of one example of a server 103 (FIG. 1) according to an embodiment of the present disclosure. The server 103 includes a processor circuit, for example, having a processor 403 and a memory 406, both of which are coupled to a local interface 409. To this end, the server 103 may comprise, for example, a server computer with such structure. The local interface 409 may comprise, for example, a data bus with an accompanying address/control bus or other bus structure as can be appreciated.

Stored in the memory 406 are both data and several components that are executable by the processor 403. In particular, stored in the memory 406 are the validation application 123, the aggregation application 126/126a, the data store application 129, the monitoring service 133, the network server application 136, the metric directory application 163, and potentially other applications. In addition, a server operating system may be stored in the memory 406 and executed by the processor as can be appreciated. Also, the aggregation queue 143, storage queue 146, data store 149, and data store 166 may be stored in the memory 406, or they may be stored in some other memory accessible to the server 103. It is understood that there may be other applications that are stored in the memory 406 and are executable by the processor 403 as can be appreciated. Also, other data may be stored in the memory 406 and accessed by the processor 403. According to one embodiment, each of the data stores 149 and 166 may comprise, for example, a database or other appropriate data storage structure. Where any component discussed herein is implemented in the form of software, any one of a number of programming languages such as, for example, C, C++, Java, Java Script, Perl, Python, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, or source code that may be expressed in proper format such as object code that is capable of being loaded into a random access portion of the memory 406 and executed by the processor 403, etc. An executable program may be stored in any portion or component of the memory 406 including, for example, random access memory, read-only memory, a hard drive, compact disk (CD), floppy disk, or other memory components.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although various components executed on the server 103 as described above may be embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowcharts of FIGS. 5-8 show the functionality and operation of portions of the aggregation application 126 and the metric directory application 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the validation application 123, the aggregation application 126, the data store application 129, the monitoring service 133, the metric directory application 163, and any other component implemented in the server 103 as described above comprises software or code, the same can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the software or code for use by or in connection with the instruction execution system. The computer readable medium can comprise any one of many physical media such as, for example, electronic, magnetic, optical, electromagnetic, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
receiving a stream of metrics in a server generated by a system over a plurality of consecutive periods of time;
aggregating the metrics in the server generated within each consecutive period of time, thereby generating at least one aggregate metric for each one of the consecutive periods of time, wherein a degree of the aggregation of the metrics for each consecutive period of time results in the at least one aggregate metric that enables monitoring of a performance of the system with respect to at least one predefined operational threshold, and wherein a first one of the consecutive periods of time occurs before a second one of the consecutive periods of time, wherein a portion of the metrics generated during the first one of the consecutive periods of time are aggregated after aggregating at least a portion of the metrics generated during the second one of the consecutive periods of time;
storing the aggregate metrics in a memory in association with corresponding ones of the consecutive periods of time;
discarding the metrics after aggregating the metrics;
storing the at least one aggregate metric for a predefined period of time before discarding the at least one aggregate metric; and
generating an output based upon the aggregate metrics that indicates a performance of the system.

2. The method of claim 1, wherein the step of aggregating the metrics in the server generated within each consecutive period of time further comprises the steps of identifying minimum and maximum ones of the metrics received from the system for each of the consecutive periods of time.

3. The method of claim 1, wherein the step of aggregating the metrics in the server generated within each consecutive period of time further comprises the step of calculating an average of the metrics received from the system for each of the consecutive periods of time.

4. A method, comprising the steps of:
generating a plurality of data models in the server from a stream of metrics describing a state of a system, each of the metrics being associated with one of a plurality of consecutive periods of time, each data model representing the metrics associated with a corresponding one of the consecutive periods of time;
storing each of the data models for a predefined period of time;
discarding each of the data models at the end of the predefined period of time; and
discarding each of the metrics after use in generating at least one of the data models.

5. The method of claim 4, further comprising the step of receiving the stream of metrics in the server from the system, where the server is in data communication with the system.

6. The method of claim 4, further comprising the step of maintaining a list of the metrics for which at least one data model is stored.

7. The method of claim 6, further comprising the step of generating a directory of the metrics included in the list that is sent to a client.

8. The method of claim 4, further comprising the step of generating an output that indicates a performance of the system based upon the data models.

9. The method of claim 4, further comprising the step of updating a stored one of the data models with one of the metrics that is received out of temporal order.

10. The method of claim 4, wherein the step of generating the data models in the server from the metrics further comprises the step of maintaining a count of the metrics received from the system for each of the consecutive periods of time.

11. The method of claim 4, wherein the step of generating the data models in the server from the metrics further comprises the step of identifying a maximum one of the metrics received from the system for each of the consecutive periods of time.

12. The method of claim 4, wherein the step of generating the data models in the server from the metrics further comprises the step of calculating an average of the metrics received from the system for each of the consecutive periods of time.

13. The method of claim 4, wherein the step of generating the data models from the metrics further comprises the steps of aggregating the metrics in the server associated with each consecutive period of time, thereby generating at least one aggregate metric for each one of the consecutive periods of time.

14. The method of claim 13, wherein a degree of the aggregation of the metrics for each consecutive period of time results in at least one aggregate metric that enables monitoring of a performance of the system with respect to at least one predefined operational threshold.

15. A system, comprising:
a server;
logic executable in the server that generates a plurality of data models in the server from a plurality of metrics associated with a plurality of consecutive periods of time, each of the metrics describing a state of a system within a respective one of the consecutive periods of time;
logic executable in the server that stores the data models in a memory accessible to the server, each data model representing the metrics associated with a corresponding one of the consecutive periods of time; and
logic executable in the server that updates a stored one of the data models with one of the metrics that is received out of a temporal order.

16. The system of claim 15, further comprising logic executable in the server that discards the metrics after use in generating at least one of the data models.

17. The system of claim 15, wherein at least one of the data models further comprises a count of the metrics associated with a respective one of the consecutive periods of time.

18. The system of claim 15, wherein at least one of the data models maintains a minimum one of the metrics associated with a respective one of the consecutive periods of time.

19. The system of claim 15, wherein at least one of the data models maintains a maximum one of the metrics associated with a respective one of the consecutive periods of time.

20. The system of claim 15, wherein at least one of the data models further comprises an average of the metrics associated with a respective one of the consecutive periods of time.

21. The system of claim 15, further comprising logic executable in the server that stores each of the data models in a memory accessible to the server for a predefined period of time before discarding the data models.

22. The system of claim 15, further comprising logic executable in the server that generates an output that indicates a past performance of the system based upon the data models.

23. The system of claim 15, wherein the logic executable in the server that generates the data models in the server from the metrics associated with the consecutive periods of time, further comprising logic executable in the server that aggregates the metrics associated with each consecutive period of time, thereby generating at least one aggregate metric for each one of the consecutive periods of time.

24. The system of claim 23, wherein a degree of the aggregation of the metrics for each consecutive period of time results in at least one aggregate metric that enables monitoring of a performance of the system with respect to at least one predefined operational threshold.

* * * * *

UNITED STATES PATENT AND TRADEMARK OFFICE
CERTIFICATE OF CORRECTION

| | | |
|---|---|---|
| PATENT NO. | : 8,381,039 B1 | Page 1 of 1 |
| APPLICATION NO. | : 12/493558 | |
| DATED | : February 19, 2013 | |
| INVENTOR(S) | : Daniel L. Osiecki et al. | |

It is certified that error appears in the above-identified patent and that said Letters Patent is hereby corrected as shown below:

In the Claims

Claim 4, Column 17, line 9, delete the word "the" and insert the word -- a -- to read as follows:

-- generating a plurality of data models in a server --

Signed and Sealed this
Twenty-ninth Day of July, 2014

Michelle K. Lee
*Deputy Director of the United States Patent and Trademark Office*